United States Patent [19]

Biswas et al.

[11] 3,919,873

[45] Nov. 18, 1975

[54] EXTRUSION MEMBER FOR POSITIONING BEHIND THE REAR FACE OF MATERIAL TO BE EXTRUDED IN AN EXTRUSION PRESS

[75] Inventors: Amit Kumar Biswas, Kaarst; Robert S. Leventer, Dusseldorf, both of Germany

[73] Assignee: Schloemann-Siemag AG, Duesseldorf, Germany

[22] Filed: Apr. 15, 1974

[21] Appl. No.: 461,235

[30] Foreign Application Priority Data
Apr. 16, 1973 Germany.......................... 2319139

[52] U.S. Cl. .................. 72/257; 72/273; 72/427
[51] Int. Cl.² ........................................ B21C 35/00
[58] Field of Search .............. 72/255, 257, 273, 427

[56] References Cited
UNITED STATES PATENTS
2,925,176   2/1960   Wyngaert................. 72/273
3,165,203   1/1965   Dom........................ 72/257
3,385,091   5/1968   Hess........................ 72/273

*Primary Examiner*—C. W. Lanham
*Assistant Examiner*—Robert M. Rogers
*Attorney, Agent, or Firm*—Holman & Stern

[57] ABSTRACT

An extrusion disc for positioning behind the rear face of a billet to be extruded in an extrusion press. The front face of the extrusion disc has a recess and a zone adjacent the recess for engaging the billet, and there are means associated with the recess for applying to the rear of the billet, after extrusion, a resilient force for separating the rear of the extrusion butt from the front of the extrusion member, the resilient force applying means either being provided by trapping air in the recess or by providing a spring-loaded plate in the recess.

19 Claims, 4 Drawing Figures

EXTRUSION MEMBER FOR POSITIONING BEHIND THE REAR FACE OF MATERIAL TO BE EXTRUDED IN AN EXTRUSION PRESS

BACKGROUND OF THE INVENTION

The invention relates to an extrusion member for insertion between the front face of an extrusion ram (which may be termed a plunger, an extrusion stem or a punch) of an extrusion press, and the rear face of the billet or material to be extruded. Such members are usually termed dummy blocks, extrusion discs or extrusion pads. The invention is particularly applicable to the extrusion of light metals or light light alloys such as aluminium and aluminium alloys where the billet temperature is for instance between, 400°C and 500°C, and it is not so important as in steel extrusion to protect the front end of the ram from the heat of the billet. An extrusion disc is usually employed in light-alloy extrusion presses, being placed loose in front of the extrusion ram, the main purpose of the disc being to prevent the extrusion ram being in physical contact with the material to be extruded; it is not the ram head but the extrusion disc which is exposed to high mechanical and thermal loadings. Furthermore, the extrusion disc can ensure trouble-free extrusion even if the container of the extrusion press is not in complete alignment with the ram. Thirdly, the extrusion disc facilitates the removal of the discard, usually termed a butt, at the end of the extrusion operation.

However, the removal of the extrusion butt is not always free of problems. In practice, the extrusion butt is still attached to the extrusion disc after being separated from the die and after dropping down together with the extrusion disc. The extrusion butt and the extrusion disc must therefore frequently be separated either manually or by mechaincal means. Various extrusion presses however are not equipped with mechanical separating devices so that in these cases, separation must be performed manually, which is of course very time consuming. There is a widespread demand for an extrusion method that operates with an extrusion disc which is fixed to the extrusion ram. However, the problem of the extrusion butt adhering to the extrusion disc still remains.

THE INVENTION

According to the invention, the extrusion member has a recess in its front face and means for applying a resilient force to the extrusion butt to separate it from the front zone adjacent the recess.

The tendency to stick of the extrusion member of the invention is greatly reduced compared to conventional extrusion discs, especially when used for aluminium extrusion, and in practice the extrusion butt often no longer adheres to the extrusion member after the end of the extrusion operation.

In one embodiment of the invention, the recess is arranged such that air is trapped therein when the extrusion member engages the rear face of the material to be extruded, and the air is compressed by the partial entry of the material into the recess. When said front zone of the extrusion member bears upon the material to be extruded, air will remain in the recess during the extrusion operation and will be compressed partly by entry of material into the recess and partly by heating. On completion of extrusion and after the extrusion butt has been cut off from the extruded strand, the air which has been compressed in the recess will tend to thrust the extrusion butt away from the extrusion member and in most cases separate the butt and extrusion member since the butt is usually attached only to the extrusion member front face around the recess, i.e., to said front zone.

In another embodiment of the invention, a duct is provided, leading through the extrusion member to the rear of the recess so that compressed air can be supplied to the recess to separate the rear face of the extrusion butt from said front zone of the extrusion member. This permits an increase in the pressure for detaching the extrusion butt from the extrusion member.

In order to improve sealing between the extrusion member and the extruded material and thus to prevent the discharge of air trapped in the recess, said front zone of the extrusion member may be inclined rearwardly and outwardly, preferably being conical with a large half angle.

In a third embodiment of the invention, the recess contains an inner member which is axially movable relative to said front zone of the extrusion member, means being provided for applying a resilient force to the movable inner member, thereby to apply the resilient force to the extrusion butt. The recess is preferably circular and is preferably surrounded by a frusto-conical surface which is inclined forwardly and outwardly, the movable inner member having a like frusto-conical surface defining its periphery and being dimensioned such that the frusto-conical surfaces are in contact with one another when the front face of the movable inner member is flush with said front zone of the extrusion member.

The force supplying means may comprise at least one spring, for instance a number of diaphragm springs, in the recess, behind the movable inner member. Prior to the extrusion operation, the spring(s) thrusts or thrust the movable inner member in front of the said front zone of the extrusion member. During the extrusion operation the spring(s) is or are compressed by the inner member, e.g., until the inner member bears on the surface surrounding the recess as well as against the base or rear of the recess. As a result, the spring(s) stores or store energy which is liberated when the ram face is discontinued; the movable inner member is then thrust forward to detach the extrusion butt from said front zone of the extrusion member.

The axial movement of the movable inner member relative to said front zone of the extrusion member is preferably limited, preferably by a headed guide member projecting rearwards from the movable inner member and passing through the part of the extrusion member behind the recess, the guide member centering the movable inner member with respect to the remainder of the extrusion member.

BRIEF DESCRIPTION OF THE DRAWINGS

Three embodiments of the invention are particularly described, by way of example, with reference to the accompanying drawings, in which.

DETAILED DESCRIPTION OF FIRST EMBODIMENT OF THE INVENTION

Figure 1:
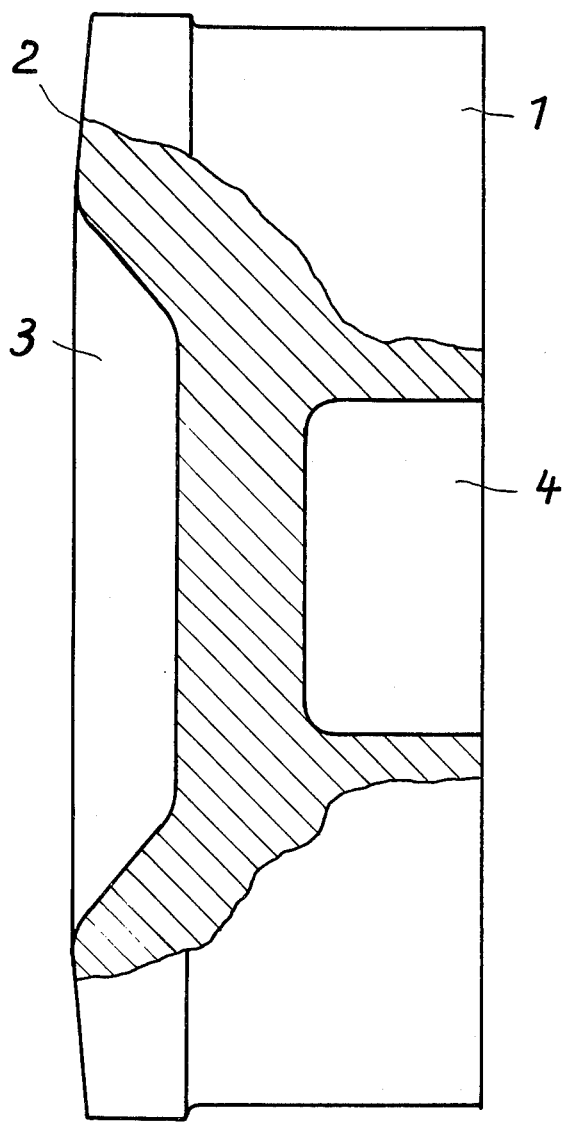
FIG. 1 is a side view of a first extrusion disc, partially in longitudinal section.

The extrusion disc 1 of FIG. 1 is to be placed in front of an extrusion ram of a metal extrusion press; the disc 1 has a front recess 3 in the middle of its front face 2, i.e., the face which will engage the billet or material to be extruded. In general, the recess may have any desired shape; it is merely necessary for the recess 3 to be in the front face 2 of the extrusion disc 1. However, the specific front recess shown preferably has a ratio of depth of recess:diameter of extrusion disc of between 1:7.5 and 1:15, and preferably about 1:10.5. Furthermore, the part where the annular wall defining the outer periphery of the recess meets the zone around the recess is preferably radiused. The front face 2 or zone around the front recess 3 has a bevel or taper, i.e., is conical in other words, the front face is inclined rearwardly and outwardly; this provides better sealing between the extrusion disc 1 and the extruded material against any possible discharge of the air trapped in the recess 3. The angle the taper or bevel makes with a transverse plane may be between 5° and 10°, the preferred angle being that shown, namely 5.5° or about 6°. The zone around the front recess preferably has a ratio of radial width (as measured perpendicular to the axis of the extrusion disc):diameter of extrusion disc of between 1:5 and 1:7 or 1:7.5 and preferably about 1:6.3.

The rear face of the extrusion disc 1, i.e, that face which will be engaged by the extrusion ram, has a cylindrical centering recess 4 for centering the extrusion disc 1 on the extrusion ram, which recess 4 makes a sliding fit on the end of the end of the extrusion ram.

The air trapped in the front recess 3 is compressed during the extrusion operation when the remainder of the front face bears upon the billet which is to be extruded. When the extrusion butt has been separated from the extruded material and the press or extrusion ram has been withdrawn, the trapped air thrusts the extrusion discard off the front end face 2 of the extrusion disc 1.

Figure 2:
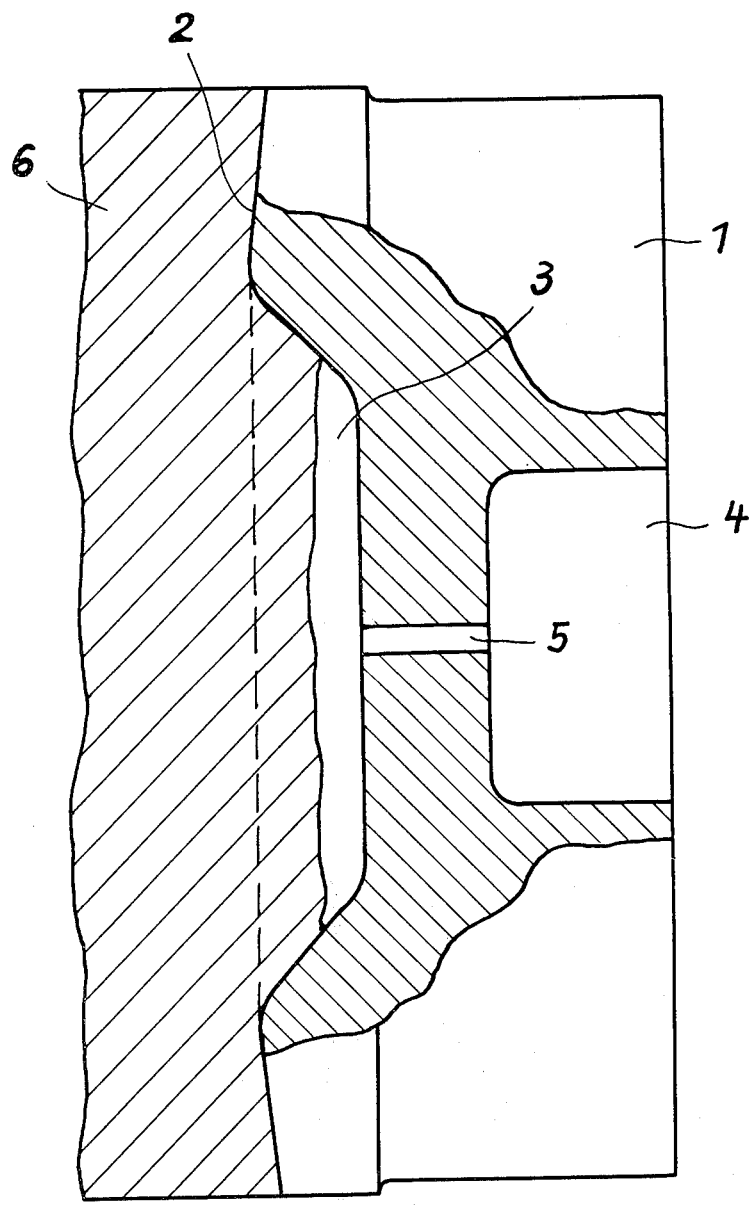
FIG. 2 is a similar view of a second extrusion disc.

The extrusion press itself is not shown, but may for instance be as shown in FIG. 1 of U.S. Pat. No. 2,933,184, where the ram has a nose which could fit into the extrusion disc centering recess 4, or as shown in FIGS. 2 and 8 of British Pat. No. 1,109,573.

DETAILED DESCRIPTION OF SECOND EMBODIMENT OF INVENTION

Figure 2A:
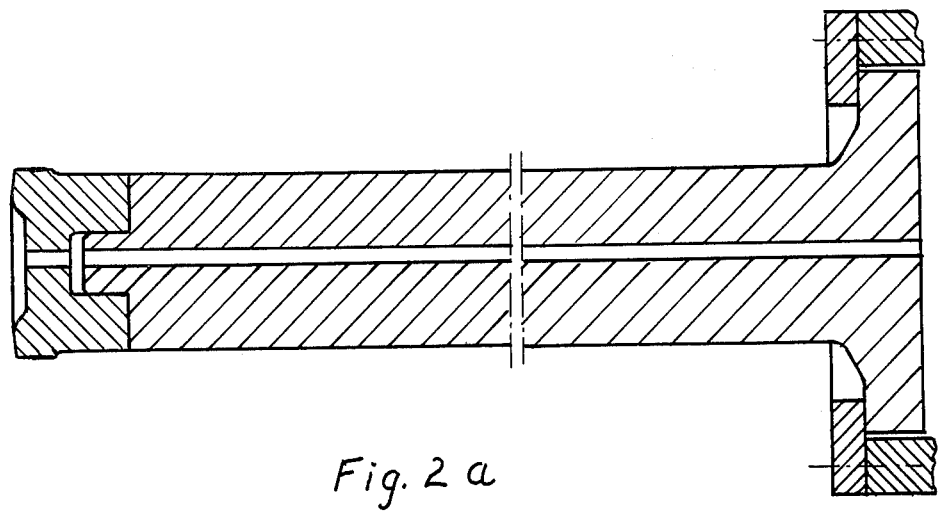
FIG. 2a is a longitudinal section of the second extrusion disc, on a smaller scale, also showing an extrusion ram.

As shown in the second embodiment (see FIGS. 2 and 2a), compressed air can be conducted after extrusion through a port 5 from the rear of the extrusion disc 1 into the front recess 3 in order to augment the action of the trapped air and to thrust the extrusion discard 6 off the extrusion disc 1. The compressed air can be supplied through a duct 7 in the extrusion ram 8. In the second embodiment, the front face 2 is shown as making an angle of 6.3° or about 6° to the plane normal to the extrusion disc 1.

DETAILED DESCRIPTION OF THIRD EMBODIMENT OF THE INVENTION

Figure 3:
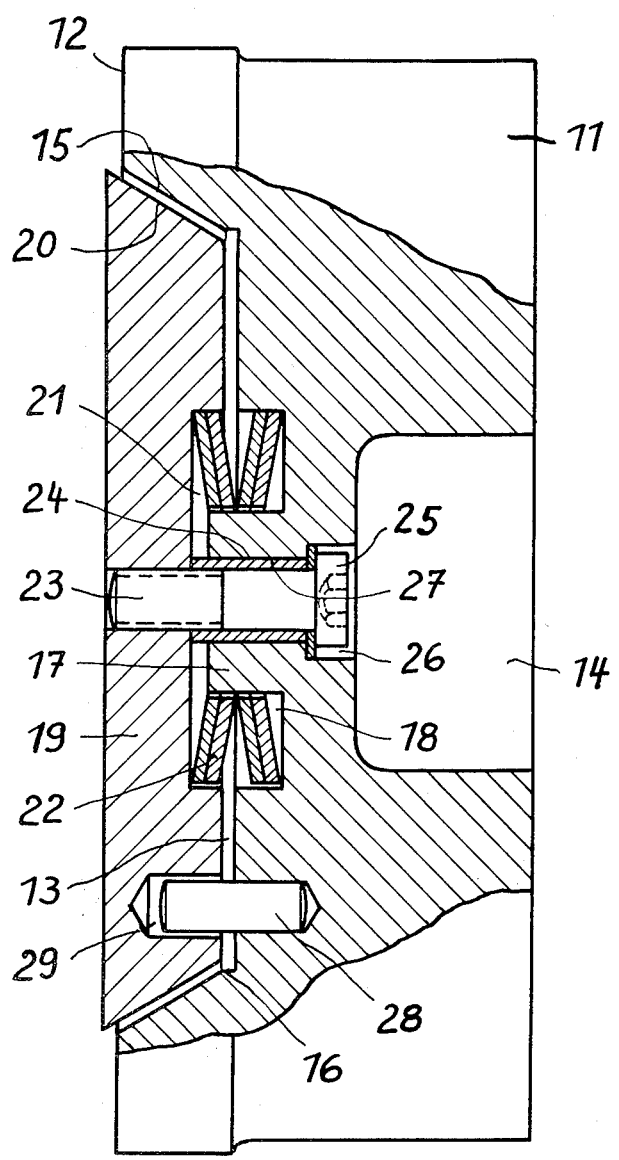
FIG. 3 is a view similar to that of FIG. 1, of a third extrusion disc.

FIG. 3 shows an extrusion disc 11 which has an outer member having a plane front face 12 provided with a circular front recess 13. The rear face of the outer member is also provided with a cylindrical centering recess 14 for centering the extrusion disc 11 on the extrusion ram; the recess 14 makes a sliding fit on the end of the extrusion ram.

The circular recess 13 has an inclined annular surface 15 which tapers inwardly in a rearwards direction and an adjoining cylindrical surface 16. In the centre of the front recess 13, the extrusion disc 11 has a spigot 17 surrounded by an annular recess 18.

A movable inner member in the form of an inner plate 19 whose periphery has a tapered annular surface 20, is mounted in the recess 13. The annular surface 20 bears on the corresponding annular surface 15 of the outer member when the front face of the inner plate 19 is flush with the front face 12 of the outer member.

The rear face of the inner plate 19 has a cylindrical recess 21 whose diameter is equal to that of the facing annular recess 18 of the extrusion disc 11. Disc or cup springs; which are referred to in the art as Belleville washers, 22, which are adapted to thrust the inner plate 19 away from the extrusion disc 11 when the inner plate 19 is unloaded, are disposed in and between the annular recess 18 and the cylindrical recess 21. The springs 22 lose their spring effect if heated to above about 300°C.

The axial movement of the inner plate 19 relative to the extrusion disc 11 is limited by means of a bolt 23 which engages in a bore 24 in the centre of the extrusion disc 11. The bolt head 25 lies in a cylindrical counterbore 26 on the rear of the extrusion disc 11. A bush 27, which functions as a spacer and surrounds the bolt 23, is provided between the bolt head 25 and the end of the counterbore 26, the bush being able to slide in the bore 24.

Guide pins 28, which engage in corresponding holes 29 in the rear of the inner plate 19, are provided in the recess 13 to avoid the inner plate 19 unscrewing off the bolt 23.

The springs 22 are compressed during the extrusion operation. When the extrusion butt has been separated from the extruded material and the press or the extrusion ram has beeen withdrawn, the springs 22 move the inner plate 19 away from the extrusion disc 11 and thus thrust the peripheral zone of the rear face of the extrusion butt away from said front zone of the extrusion disc. If the extrusion butt adheres firmly to the inner plate 19, this leaves an annular gap between the rear face of the extrusion butt and said front zone of the extrusion disc, enabling a tool to be inserted to remove the butt from the inner plate 19. However, it is found in practice with normal extrusion discs that the butt adheres much more firmly around the edge of the front face of extrusion disc, and the separation of the peripheral zone of the butt rear face can cause the butt to fall off the disc.

The great advantage of the third embodiment of the invention is that a predetermined force can be appled to the rear face of the extrusion butt in a simple manner, without any necessity for providing bores in the ram and hose connections to the ram, and without any necessity for providing lengthy mechanical elements such as long push-rods. The energy employed for pushing the extrusion butt away from the front zone of the extrusion disc 11 is derived from the force of the ram itself, which compresses the springs 22 to store the energy; as in the first and second embodiments of the invention, the resilient force is already applied to the rear face of the extrusion butt before the completion of the extrusion operation proper, i.e., while the billet is still being extruded through the die. It is also believed that there may be an advantage in using a resilient force on the inner plate 19, in that if the rear face of the extrusion butt sticks hard to the front zone of the extrusion disc 11, the inner plate 19 is not thrust a substantial distance into the butt.

We claim:

1. An extrusion member for positioning behind the rear face of a billet to be extruded in an extrusion press, for transferring the force of an extrusion ram to said billet, said extrusion member having an outer, annular, billet-engaging front face which is slightly inclined rearwardly and outwardly, said front face surrounding a central recess defined in the front of said extrusion member by a base and sides which are impermeable to air, whereby air is trapped in said recess when said extrusion member engages said rear face of said billet and said air is compressed by partial entry of material of said billet into said recess.

2. The extrusion member of claim 1, wherein said front face extends at an angle of about 5° to the plane normal to the axis of said extrusion member.

3. The extrusion member of claim 1, wherein the ratio of the radial width of said front face (as measured normal to the axis of said extrusion member) to the diameter of said extrusion member is about 1:6.3.

4. The extrusion member of claim 1, wherein the ratio of the radial width of said front face (as measured normal to the axis of said extrusion member) to the diameter of said extrusion member is between 1:5 and 1:7, and wherein the ratio of the depth of said recess to the diameter of said extrusion member is about 1:10.5.

5. An extrusion member for positioning behind the rear face of a billet to be extruded in an extrusion press, for transferring the force of an extrusion ram to said billet, said extrusion member having an outer, annular billet-engaging front face which is slightly inclined rearwardly and outwardly, said front face surrounding a central recess defined in the front of said extrusion member by a base and sides which are impermeable to air with the exception of a duct defined in said base, whereby, when said billet has been extruded, the extruding force has been relieved and the rear portion of said billet has been cut off as an extrusion butt, compressed air can be supplied via said duct to said recess to separate said extrusion butt from said extrusion member.

6. The extrusion member of claim 5, wherein said front face extends at an angle of about 6° to the plane normal to the axis of said extrusion member.

7. The extrusion member of claim 5, wherein the ratio of the radial width of said front face (as measured normal to the axis of said extrusion member) to the diameter of said extrusion member is about 1:6.3.

8. An extrusion member for positioning behind the rear face of a billet to be extruded in an extrusion press, for transferring the force of an extrusion ram to said billet, said extrusion member comprising:

an outer member having an outer, annular, billet-engaging front face surrounding a central recess defined in said outer member;

means for mounting said outer member on an extrusion ram;

an inner member in said recess, for axial movement relative to said outer member, said inner member having a billet-engaging front face which will be proud of said front face of said outer member when said inner member is in its foremost position relative to said outer member; and means for applying to said inner member a force in a direction causing said inner member to move forward relative to said outer member, whereby, when said billet has been extruded, when the extruding force has been relieved and when the rear portion of said billet has been cut off as an extrusion butt, said force can be employed to separate said extrusion butt from said outer member.

9. The extrusion member of claim 8, wherein said recess is circular and is defined by surfaces comprising a base and a frusto-conical surface which is inclined forwardly and outwardly, said inner member having a like frusto-conical surface defining the periphery of said inner member, said frusto-conical surfaces being in contact with one another when the front face of the movable inner member is flush with said front face of said outer member.

10. The extrusion member of claim 8, wherein said outer member has a part located behind said inner member, and wherein said extrusion member further comprises a headed guide member projecting rearwards from said inner member and passing through said part of said outer member, said guide member centering said inner member with respect to said outer member and also limiting the forward axial movement of said inner member relative to said outer member to a foremost position in which said front face of said inner member is proud of said front face of said outer member.

11. The extrusion member of claim 8, and comprising means limiting the rearward movement of said inner member relative to said outer member to a rearmost position in which said front face of said inner member is substantially flush with said front face of said outer member.

12. The extrusion member of claim 11, wherein said front faces of said inner and outer members are planar and normal to the axis of said extrusion member.

13. The extrusion member of claim 8, wherein said force applying means is spring means located behind said inner member.

14. The extrusion member of claim 8, wherein said force applying means comprises at least one Belleville washer in said recess, behind said inner member.

15. The extrusion member of claim 8, wherein said mounting means comprises a recess defined in the rear face of said outer member, for making a sliding fit with a corresponding part on the front end of said extrusion ram.

16. An extrusion member for positioning behind the rear face of a billet to be extruded in an extrusion press, for transferring the force of an extrusion ram to said billet, said extrusion member comprising:

an outer member having an outer, annular, billet-engaging front face surrounging a central recess defined in said outer member;

means for mounting said outer member on an extrusion ram;

an inner member in said recess, for axial movement relative to said outer member, said inner member having a billet-engaging front face which will be proud of said front face of said outer member when said inner member is in its foremost position relative to said outer member; and spring means behind said inner member, for applying to said inner member a resilient force in a direction causing said inner member to move forward relative to said outer member, whereby, when said extrusion ram applies an extrusion force to said billet by way of said extrusion member, the potential energy of said spring means is increased by rearward axial movement of said inner member relative to said outer member, and, when said billet has been extruded, when said extrusion force has been relieved and when the rear portion of said billet has been cut off as an extrusion butt, said resilient force can be employed to separate said extrusion butt from said outer member.

17. The extrusion member of claim 16, wherein said spring means comprises at least one Belleville washer in said recess, behind said inner member.

18. The extrusion member of claim 16, wherein said mounting means comprises a recess defined in the rear face of said outer member, for making a sliding fit with a corresonding part on the front end of said extrusion ram.

19. An extrusion member for positioning behind the rear face of a billet to be extruded in an extrusion press, for transferring the force of an extrusion ram to said billet, said extrusion member having an outer, annular, billet-engaging front face surrounding a central recess defined in the front of said extrusion member, an inner member in said recess, said inner member being axially movable relative to said front face, and at least one Belleville washer in said recess, behind said inner member, for applying a resilient force to said inner member and thereby for applying a resilient force to the rear of said billet in a direction separating the rear of said billet from said front face, whereby, when said billet has been extruded, the extruding force has been relieved and the rear portion of said billet has been cut off as an extrusion butt, said resilient force can be employed to separate said extrusion butt from said extrusion member.

* * * * *